(12) United States Patent
Kihara

(10) Patent No.: US 9,934,472 B2
(45) Date of Patent: Apr. 3, 2018

(54) PARKING RESERVATION SYSTEM

(71) Applicant: DAITO SEISAKUSHO CO., LTD., Tokyo (JP)

(72) Inventor: Satoshi Kihara, Tokyo (JP)

(73) Assignee: DAITO SEISAKUSHO CO., LTD., Tokyo (JP)

( * ) Notice: Subject to any disclaimer, the term of this patent is extended or adjusted under 35 U.S.C. 154(b) by 0 days.

(21) Appl. No.: 15/382,228

(22) Filed: Dec. 16, 2016

(65) Prior Publication Data

US 2017/0206472 A1    Jul. 20, 2017

(30) Foreign Application Priority Data

Jan. 17, 2016  (JP) ................................. 2016-006717
Mar. 14, 2016  (JP) ................................. 2016-049262

(51) Int. Cl.
*G06Q 10/02* (2012.01)

(52) U.S. Cl.
CPC .................... *G06Q 10/02* (2013.01)

(58) Field of Classification Search
CPC ...................................................... G06Q 10/02
See application file for complete search history.

(56) References Cited

U.S. PATENT DOCUMENTS

| | | | | | |
|---|---|---|---|---|---|
| 3,849,936 | A * | 11/1974 | Geraci | .................. | E01F 13/085 49/35 |
| 2012/0092191 | A1* | 4/2012 | Stefik | .................... | G06Q 10/02 340/932.2 |
| 2012/0095791 | A1* | 4/2012 | Stefik | .................... | G06Q 10/02 705/5 |
| 2015/0138001 | A1* | 5/2015 | Davies | .................. | G08G 1/149 340/932.2 |
| 2015/0294286 | A1* | 10/2015 | Grote | .................. | G06Q 20/145 705/13 |
| 2015/0356469 | A1* | 12/2015 | Su | .......................... | G06Q 10/02 705/4 |
| 2015/0369618 | A1* | 12/2015 | Barnard | ............. | H05B 37/0272 701/491 |

FOREIGN PATENT DOCUMENTS

JP      2004-272736 A      9/2004

OTHER PUBLICATIONS

Liu, Wei, Morning Commute with Bottleneck Congestion and Parking Space Constraints, Hong Kong University of Science and Technology, Aug. 2014.*

* cited by examiner

*Primary Examiner* — Nathan Erb
(74) *Attorney, Agent, or Firm* — Konomi Takeshita

(57) ABSTRACT

A parking reservation system for a parking lot provided with a plurality of parking spaces, comprising parking spaces for reservation to which reservation of user with reservation is set and is also available for user without reservation; and spare parking spaces which the user with reservation can use instead of the parking spaces for reservation when the parking spaces for reservation to which reservation of the user with reservation is set is used by the user without reservation, wherein a spare number setting section is provided for setting number of the spare parking spaces by using usage behavior relation information in relation to usage behavior at the parking lot of the user at least either of the user without reservation or the user with reservation.

16 Claims, 11 Drawing Sheets

PARKING RESERVATION SYSTEM

FIELD OF THE INVENTION

The present invention relates to a parking reservation system.

BACKGROUND OF THE INVENTION

An example relating to a reservation system of a parking lot is disclosed in Patent Document 1. This reservation system comprises a reservation acceptance system and a parking lot usage management system, and is connected through a network each other.

Users of the parking lot have access to a reservation acceptance system by using a terminal unit connected to the network, and send positional information to the terminal unit together with reservation request information. The reservation acceptance system determines if the user is within a predetermined range near the parking lot, and if the number of vacant spaces of the parking lot is a predetermined number or more based on the received positional information. The reservation acceptance system accepts the reservation request from the user if the user is within the predetermined range from the parking lot and the number of the vacant spaces is the predetermined number or more.

In order to certainly offer parking spaces to the users with reservation in the parking lot, it is necessary to secure the parking spaces upon reservation. However, the reserved parking spaces are not available during a period from reservation to arrival of the user, and usage effect is reduced. Accordingly, the above reservation system becomes available when the user approaches the parking lot to a certain degree, and reduction in the usage effect is inhibited by shortening a period from reservation to arrival of the user.

PRIOR ART DOCUMENT

Patent Document

[Patent Document 1] JP 2004-272736 A

SUMMARY OF THE INVENTION

Problems to be Solved by Invention

Through it is relative short time, according to the above reservation system, the parking spaces are not available during the period from reservation to arrival of the user. In order to improve the usage effect, the parking lot may comprise parking spaces for reservation to which reservation of the user is set, and is also available for the use without reservation, and spare parking spaces which is available for user with reservation instead of the parking spaces for reservation when the parking spaces for reservation to which the reservation of the user is set in advance is occupied by the user without reservation.

According to such configuration, however, users with reservation can not park if the spare parking spaces are shortage. On the other hand, if the spare parking spaces are in excess, the usage effect is reduced and there becomes a problem how appropriately set the number of the spare parking spaces.

Furthermore, if an interval is short between periods of reservations, when a previous user with reservation uses the parking space over a reservation period, a next user with reservation may not use the parking space. If the above interval is large, the usage effect is also reduced.

An object of the present invention is to avoid a case that users with reservation can not use the parking lot, and to provide parking reservation system for inhibiting usage effect to be reduced.

Means for Solving Problems

In order to accomplish the above purpose, according to an embodiment of the present invention, (1) there is provided a parking reservation system for a parking lot provided with a plurality of parking spaces comprising parking spaces for reservation to which reservation of user with reservation is set and is also available for user without reservation, and spare parking spaces which the user with reservation can use instead of the parking spaces for reservation, when the parking spaces for reservation to which reservation of the user with reservation is set is used by the user without reservation, wherein a spare number setting section is provided for setting number of the spare parking spaces by using usage behavior relation information in relation to usage behavior at the parking lot of the user at least either of the user without reservation or the user with reservation.

According to the present invention, the number of the spare parking spaces is set by using the usage behavior relation information in relation to usage behavior at the parking lot of the user at least either of the user without reservation or the user with reservation. Items such as weather, day and time, and event nearby the parking lot affecting usage behavior of the user at the parking lot are reflected to the number of the spare parking spaces, and the spare parking spaces may be appropriately secured. Accordingly, when the spare parking spaces instead of the parking spaces for reservation are used by the user with reservation, shortage of the spare parking spaces is inhibited and reduction in usage effect may be also inhibited.

According to the present invention, (2) it is preferable that a parking reservation system further comprises an interval minimum value setting section for setting a minimum value of an interval between a reservation period in relation to reservation already set to the parking spaces for reservation and reservation period in relation to a reservation newly set to the parking spaces for reservation, and a reservation setting section for setting a new reservation to the parking spaces for reservation in response to a reservation setting request from the user with reservation, wherein if the interval between the reservation period in relation to the reservation newly set and the reservation period in relation to the reservation already set to the parking spaces for reservation becomes more than a minimum value of the interval set by the interval minimum value setting section, the reservation setting section sets the reservation to the parking spaces for reservation. Thus, the items such as weather, day and time, and event nearby the parking lot affecting usage behavior of the user at the parking lot are reflected to the minimum value of the above interval, the interval between the reservation period in relation to a reservation set to the parking space for the reservation and the reservation period in relation to another reservation may be appropriately secured, and the reservation may be appropriately set thereby. For example, if the minimum value of this interval becomes greater, probability is reduced that use by the user with reservation of the previous reservation period is dragged on into next reservation, and the user with reservation can not use the parking spaces for reservation, reduction usage effect of the spare parking space is inhibited by making the minimum value of the interval small, and thereby these balance can be adjusted.

In order to accomplish the above purpose, according to another embodiment of the present invention, (3) there is provided a parking reservation system for a parking lot provided with a plurality of parking spaces comprising parking spaces for reservation to which reservation of user with reservation is set and is also available for user without reservation, and spare parking spaces which the user with reservation can use instead of the parking spaces for reservation when said parking spaces for reservation to which reservation of said user with reservation is set is used by said user without reservation, further comprising; an interval minimum value setting section for setting the minimum value of the interval between the reservation period in relation to the reservation which is set to said parking spaces for reservation and the reservation period in relation to a reservation newly set to the parking spaces for reservation by using usage behavior relation information in relation to usage behavior at said parking lot for at least either of said user without reservation or said user with reservation; and a reservation setting section for newly setting the reservation to said parking spaces for reservation in response to a reservation setting request from the user with reservation; wherein if the interval between the reservation period in relation to the reservation newly set and the reservation period in relation to the reservation already set to said parking spaces for reservation becomes more than a minimum value of said interval set by said interval minimum value setting section, said reservation setting section sets said reservation to the parking spaces for reservation.

According to the present invention, the minimum value of the interval between the reservation period in relation to the reservation set to the parking space for reservation and the reservation period in relation to the reservation newly set to the parking spaces for reservation may be set by using the usage behavior relation information. Thus, the items such as weather, and day and time affecting usage behavior of the user at the parking lot are reflected to the minimum value of the above interval, and the interval between the reservation period in relation to a reservation set to the parking space for the reservation and the reservation period in relation to another reservation may be appropriately secured, and the reservation may be appropriately set thereby. If the minimum value of this interval becomes greater, probability is reduced that use by the user with reservation of the previous reservation period is pushed back into next reservation, and the user with reservation can not use the parking spaces for reservation, reduction usage effect of the spare parking space is inhibited by making the minimum value of the interval small, and thereby these balance can be adjusted.

According to the present invention, (4) it is preferable that a parking reservation system further comprises a relationship information storage section for storing relationship information showing a relation between said usage behavior relation information and a spare number setting value to be set as number of said spare parking spaces, and said spare number setting section sets said spare number setting value specified from said relationship information by using said usage behavior relation information as the number of said spare parking spaces. Thus, the number of the spare parking spaces can be set in a simple manner.

According to the present invention, (5) a parking reservation system further comprises a relationship information storage section for storing relationship information showing relationship between said usage behavior relation information and the interval minimum value setting value to be set as the minimum value of said interval, and it is preferable that said interval minimum value setting section sets said interval minimum value setting value specified from said relationship information by using said usage behavior relation information as a minimum value of said interval. Thus, the interval minimum value of the reservation period can be set in a simple manner.

According to the present invention, (6) it is preferable that a parking reservation system further comprise a behavior information storage section for correlating and storing said usage behavior relation information and an actual usage behavior information showing actual said usage behavior, and a relationship information updating section for updating said relationship information stored in said relationship information storage section by using said usage behavior relation information stored in said behavior information storage section and said actual usage behavior information. Thus, new usage behavior relation information and the actual usage behavior information are stored in the behavior information storage section, and such stored information may be reflected to the relationship information stored in the relationship information storage section. Accordingly, accuracy can be improved by learning and reflecting the usage behavior at the parking lot of at least either of the user with reservation or the user without reservation to the relationship information.

According to the present invention, (7) said usage behavior relation information may include one or more information selected from weather, a time and an event held nearby said parking lot. (8) The usage behavior relation information may include characteristic information of the user with reservation including at least either of information in relation to a previous usage behavior at the parking lot of said individual user with reservation and information in relation to characteristics of said user with reservation. (9) The usage behavior relation information may include information in relation to the previous usage behavior at said parking lot of said user without reservation.

According to the present invention, (10) it is preferable that said usage behavior relation information includes characteristic information of the user with reservation including at least either of information in relation to a previous usage behavior at the parking lot of said user with reservation and information in relation to characteristics of said user with reservation, and when said characteristic information of said user with reservation in relation to reservation already set to said parking spaces for reservation satisfies an individual setting condition, said interval minimum value setting section individually sets the minimum value of the interval between reservation period in relation to the reservation and reservation period in relation to a reservation newly set to the parking space for reservation by using the characteristic information of the user with reservation. Thus, the minimum value of the interval may be individually set between reservation period in relation to the reservation and reservation period in relation to a reservation newly set to the parking space for reservation by using the characteristic information of the user with reservation showing the characteristics of each user with reservation in relation to the reservation set to the parking space for reservation. Therefore, balance between problem that the user with reservation can not use the parking space for reservation and usage effect of the parking space for reservation may be appropriately adjusted in comparison with configuration for setting the common minimum value of the interval to overall parking reservation system.

According to the present invention, (11) it is preferable that the interval minimum value setting section individually sets the minimum value of said interval before and after reservation period in relation to the reservation set to said parking spaces for reservation by using the characteristic information of the user with reservation. Thus, each of setting values of the interval before and after reservation period may be separately determined. Balance between problem that the user with reservation can not use the parking space for reservation and usage effect of the parking space for reservation may be appropriately adjusted.

According to the present invention, (12) it is preferable that when an interval between a reservation period in relation to reservation newly set and a reservation period in relation to reservation already set to said parking spaces for reservation becomes more than minimum value of said interval set by said interval minimum value setting section, and does not timely overlap reservation period in relation to all reservations already set to said parking spaces for reservation, said reservation setting section sets said reservation to the parking spaces of the reservation. Thus, when the just before user with reservation uses the parking spaces for reservation to which the reservation already set by extending the usage period for dragging out into the usage period in relation to the reservation, or the vehicle without reservation is parked, even if the user with reservation is guided to the spare parking spaces in relation to the reservation, the reservation periods of the users with reservation are not overlapped. Accordingly, the user with reservation may effectively store the vehicle into the spare parking space.

According to the present invention, (13) it is preferable that when an interval between a reservation period in relation to reservation newly set and a reservation period in relation to reservation already set to said parking spaces for reservation becomes more than minimum value of said interval set by said interval minimum value setting section, and does not timely overlap enlarged reservation period to which margin period is added and enlarged before and after the reservation period in relation to all reservations already set to said parking spaces for reservation, said reservation setting section sets said reservation to the parking spaces of the reservation. Thus, if the user with reservation guided to the spare parking space uses over the reservation period, the margin period absorbs an exceeded period and the user with reservation effectively stores the vehicle to the spare parking space.

According to the present invention, (14) it is preferable that said usage behavior relation information includes characteristic information of the user with reservation including at least either of information in relation to an individual previous usage behavior at the parking lot of said user with reservation and information in relation to characteristics of said user with reservation, and a margin period setting section is provided for setting said margin period by using said characteristic information of the user with reservation. Thus, an individual setting may be made to the margin period added before and after the reservation period in relation to the reservation by using the characteristic information of the user with reservation showing an individual characteristic of the user with reservation in relation to the reservation which is set to the parking spaces for reservation. Accordingly, reduction in the usage effect of the parking space is effectively inhibited in comparison with a configuration for setting common margin period to overall parking reservation system.

Effect of Invention

According to the present invention, it becomes possible to effectively avoid the case which user with reservation can not use the parking spaces and inhibit reduction in usage effect.

DETAILED DESCRIPTION OF THE INVENTION

Hereinafter, description will be made of a parking reservation system according to the present invention with reference to FIGS. 1 to 7.

Figure 1:
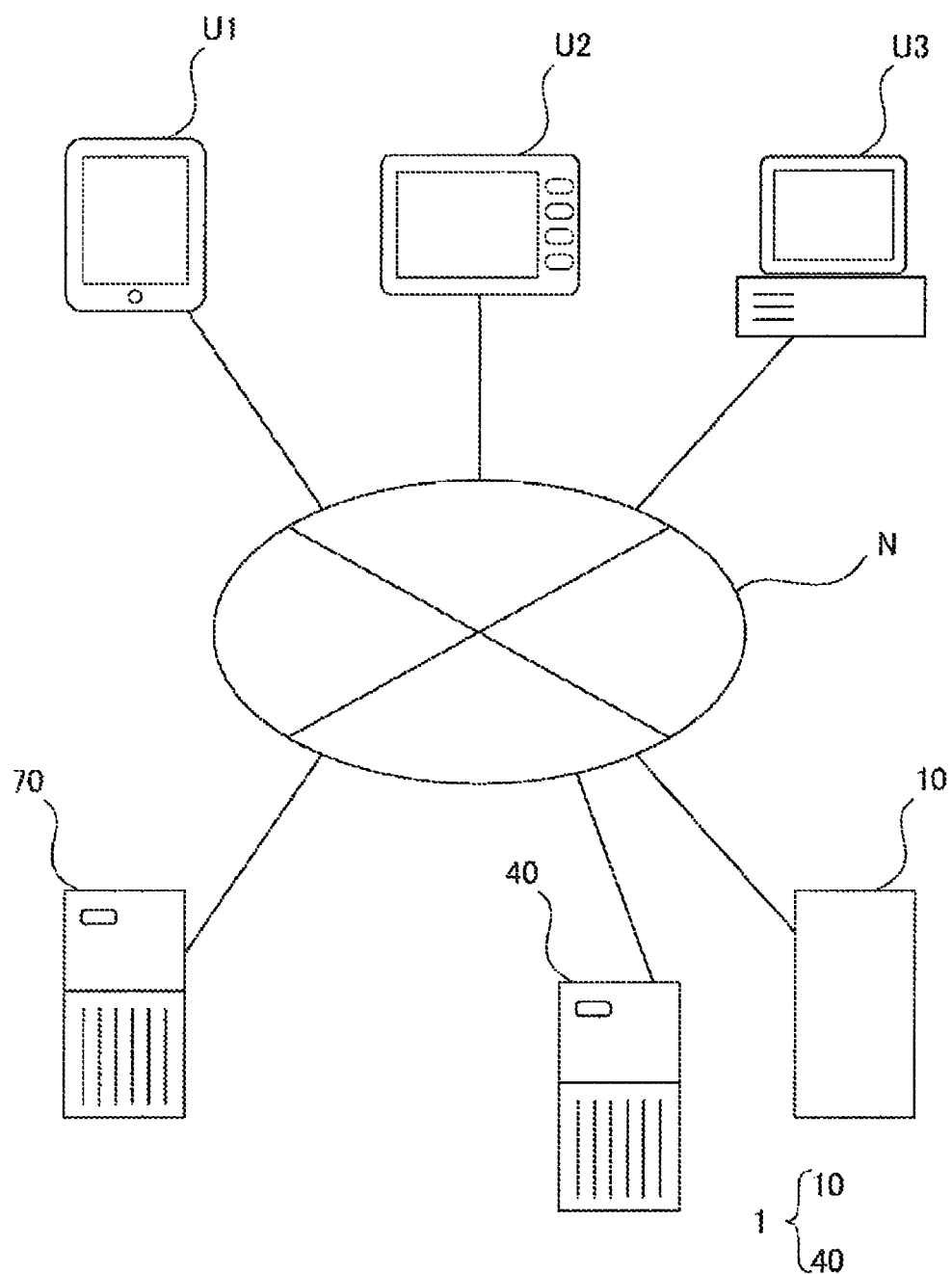
FIG. 1 is a configuration diagram of a parking reservation system according to the present invention having a parking management unit a reservation managing server unit, and user terminals and an information server unit connected to the parking reservation system through a network.
Figure 2:
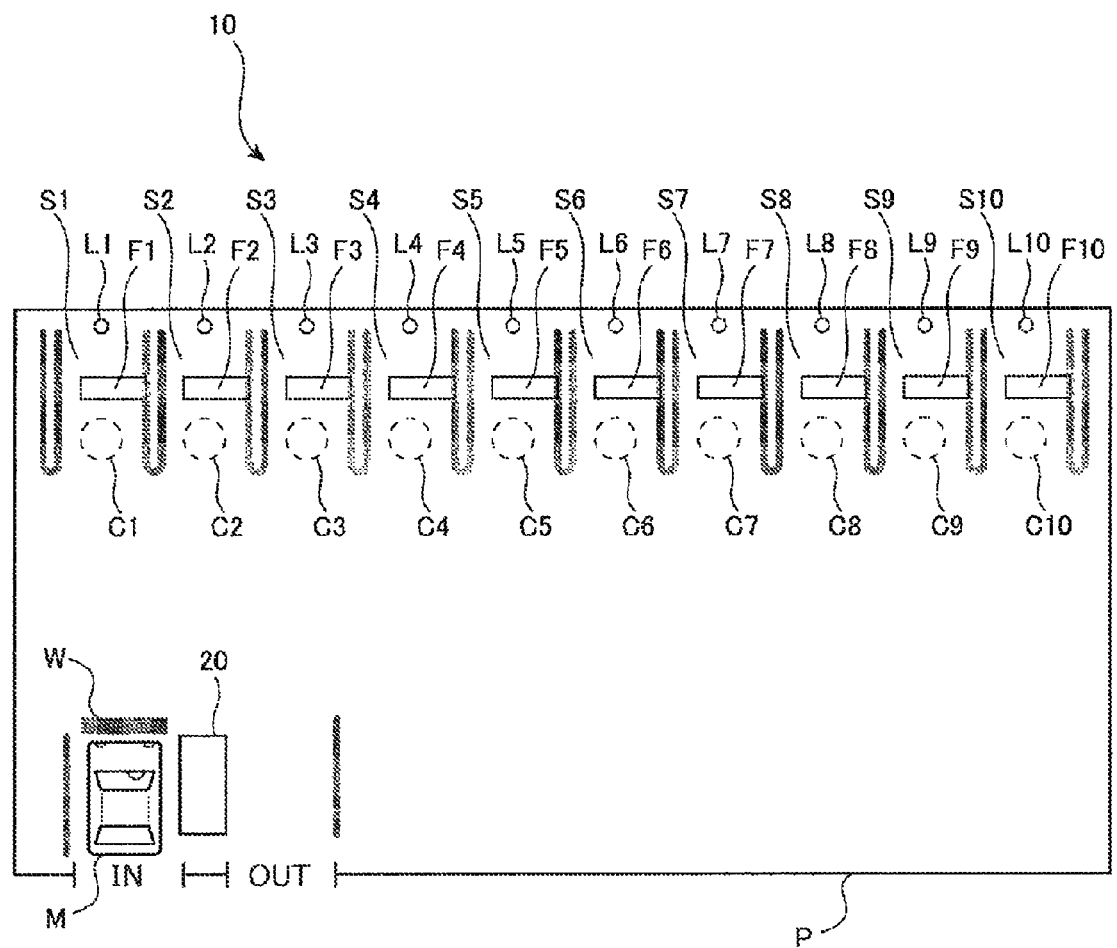
FIG. 2 is a diagram illustrating a parking lot provided with the parking management unit of FIG. 1.
Figure 3:
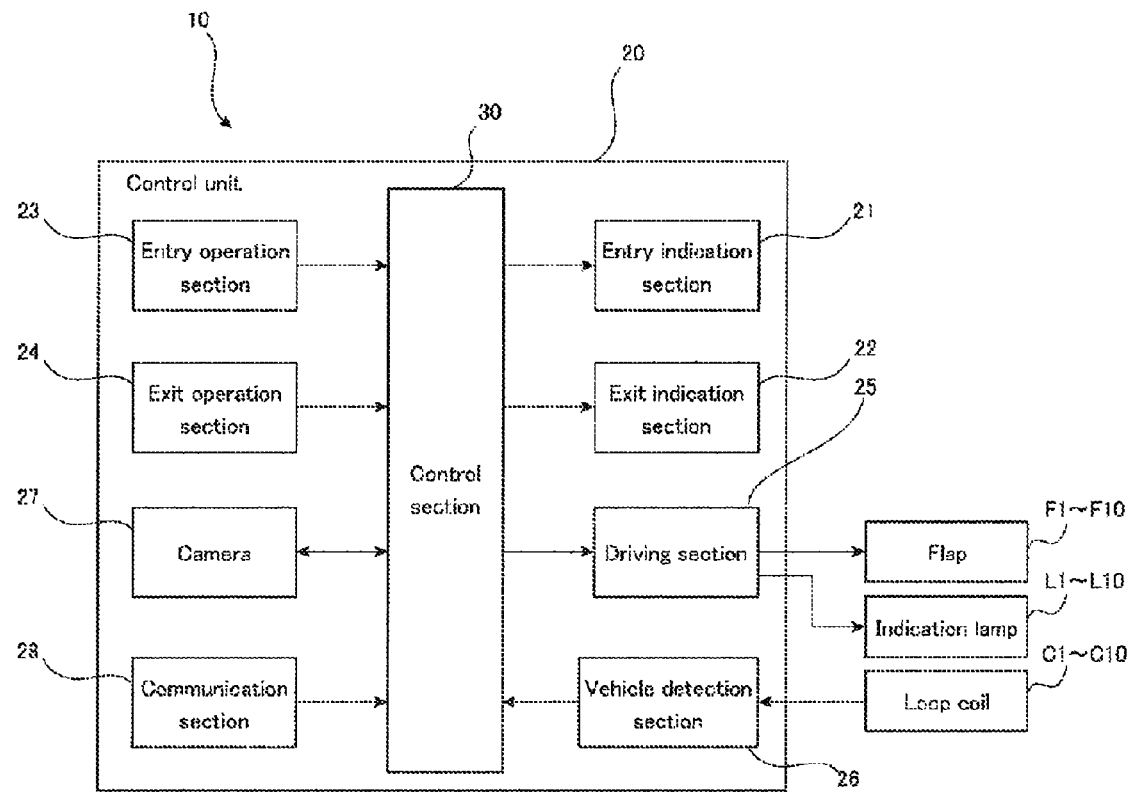
FIG. 3 is a block diagram illustrating schematic configuration of the parking management unit of FIG. 1.
Figure 4:
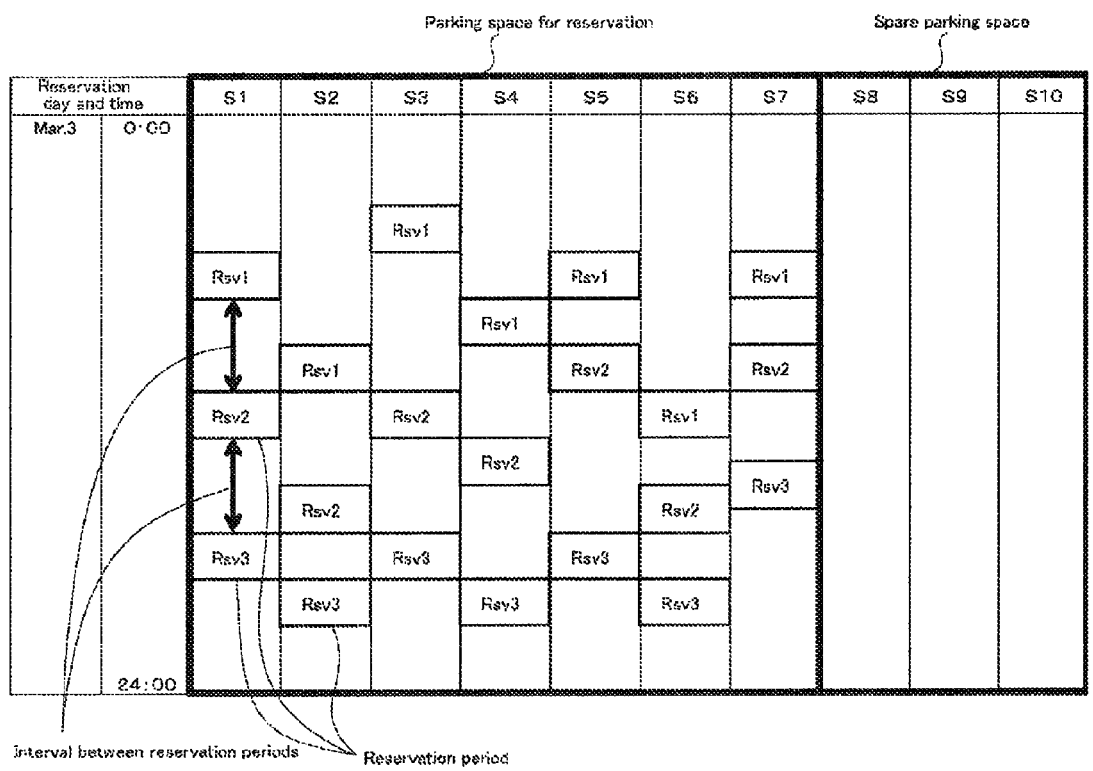
FIG. 4 is a diagram illustrating reservation setting information managed by a reservation managing server unit of FIG. 1.
Figure 5:
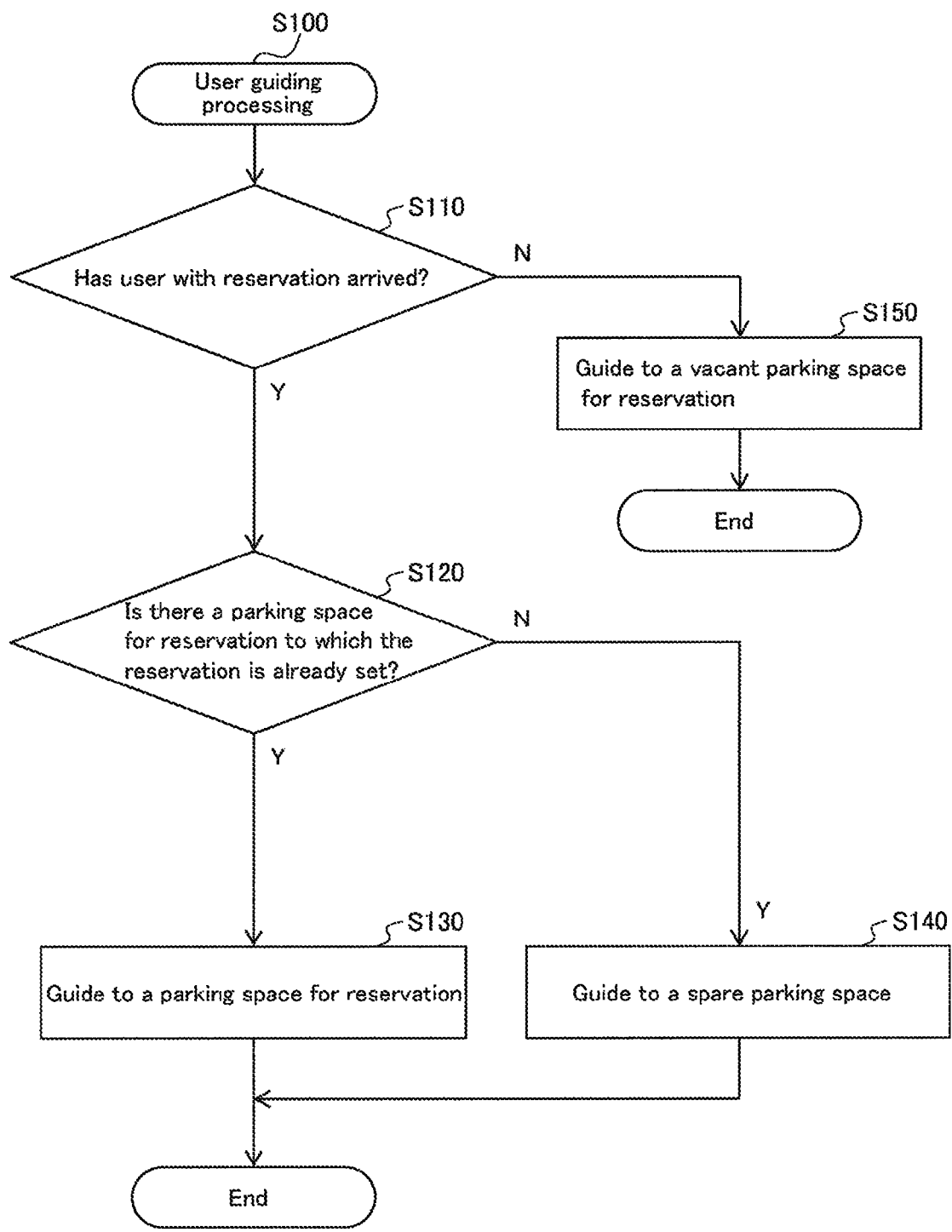
FIG. 5 is a flowchart illustrating a process of user guiding executed in the reservation managing server unit of FIG. 1.
Figure 6:
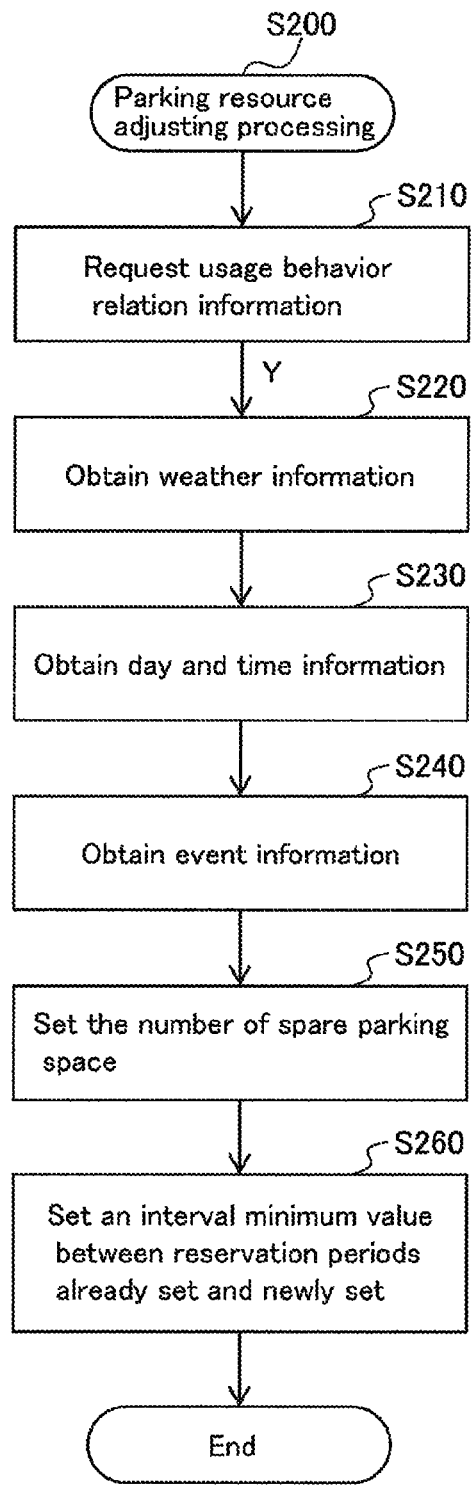
FIG. 6 is a flowchart illustrating a process of parking resource adjusting executed in the reservation managing server unit of FIG. 1.
Figure 7:
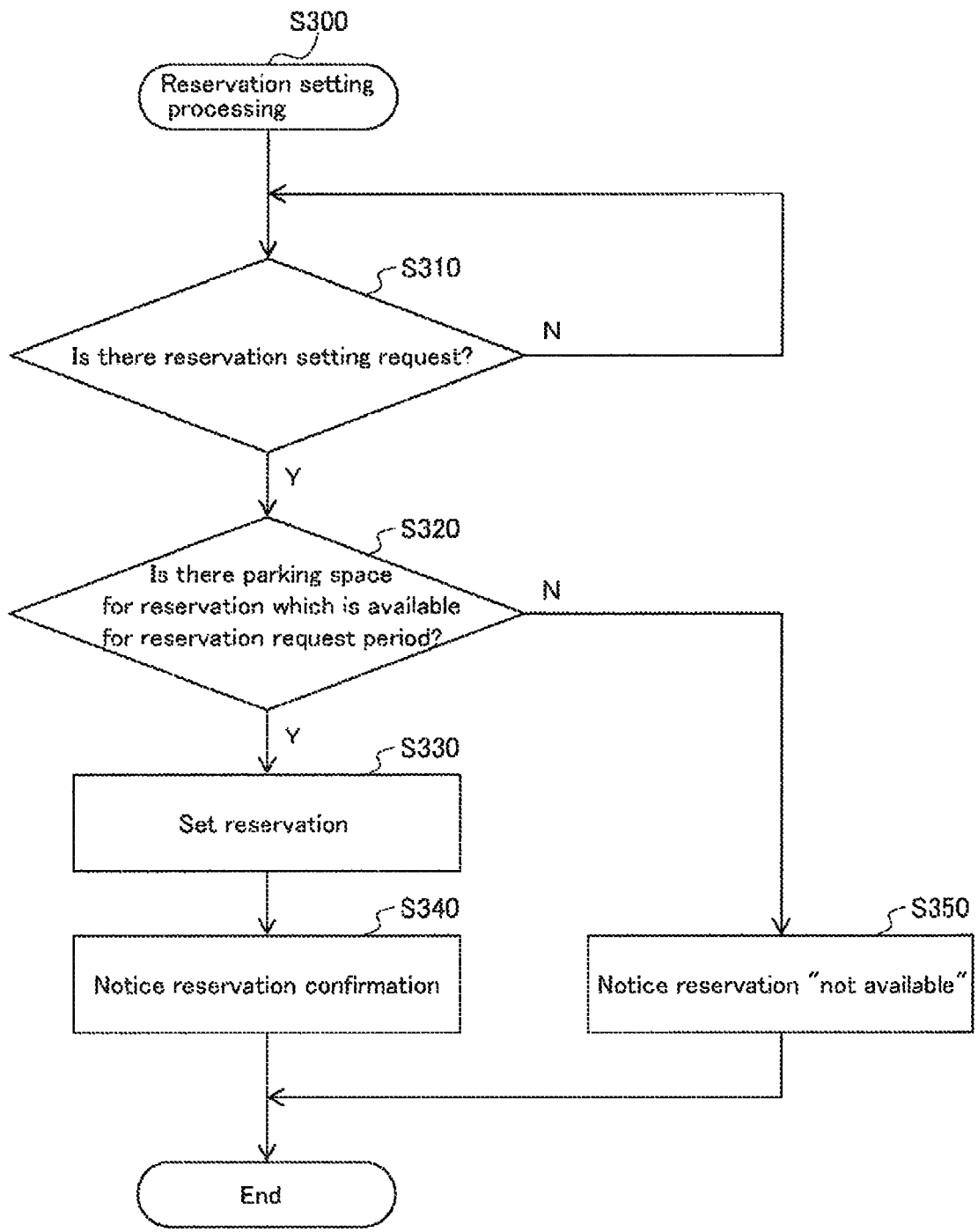
FIG. 7 is a flowchart illustrating a process of reservation setting executed in the reservation managing server unit of FIG. 1.

FIG. 1 shows a configuration diagram of a parking reservation system according to the present invention having a parking management unit and a reservation managing server unit, and user terminals and an information server unit connected to the parking reservation system through a network. FIG. 2 is a diagram illustrating a parking lot provided with the parking management unit of FIG. 1. FIG. 3 is a block diagram illustrating schematic configuration of the parking management unit of FIG. 1. FIG. 4 is a diagram illustrating reservation setting information managed by a reservation managing server unit of FIG. 1. FIG. 5 is a flowchart illustrating a process of user guiding executed in the reservation managing server unit of FIG. 1. FIG. 6 is a flowchart illustrating a process of parking resource adjusting executed in the reservation managing server unit of FIG. 1. FIG. 7 is a flowchart illustrating a process of reservation setting executed in the reservation managing server unit of FIG. 1.

According to the parking reservation system (shown as a reference numeral 1 in figures) of embodiments of the present invention comprises a parking management unit 10 and a reservation managing server unit 40. In the parking reservation system 1 implements reservation management of a parking lot P having a plurality of parking spaces S1 to S10 shown in FIG. 2.

According to the parking reservation system 1, reservation usage does not become available unless a member registration is made in advance, and a name and a vehicle registration number are registered. Hereinafter, users of the reservation usage are referred to as users with reservation, and users of non-reservation usage are referred to as users without reservation.

The parking management unit 10 and the reservation managing server unit 40 are connected each other through a network N such as an internet. User terminals U1 to U3 such as a smartphone, a car navigation system mounted on a vehicle M and a personal computer are connected to this network N. Such user terminals U1 to U3 send reservation setting request to the reservation managing server unit 40 through the network N, and reservation of the parking lot P is made.

Furthermore, an information server unit 70 is connected to the network N, and information server unit 70 provides usage behavior relation information J including weather information in a location of parking lot P, day and time information and event information nearby the parking lot P. The reservation managing server unit 40 communicates with the information server unit 70, and obtains the usage behavior relation information J. Date information may be obtained from a clocking part in the reservation managing server unit 40.

Hereinafter, description will be made of the parking management unit 10 and the reservation managing server unit 40 in order.

As shown in FIGS. 2 and 3, the parking management unit 10 comprises a control unit 20, flaps F1 to F10, indication lamps L1 to L10 and loop coils C1 to C10 provided to a plurality of parking spaces S1 to S10, respectively.

The flap F1 to F10 are opened and closed for controlling entry and exit of a vehicle M to/from parking spaces S1 to S10. The indication lamps L1 to L10 are lighted for guiding the vehicle M to any one of a plurality of parking spaces S1 to S10. The loop coils C1 to C10 are used for determining if the vehicle M enters or exits to/from each of parking spaces S1 to S10.

The control unit 20 comprises an entry indication section 21, an exit indication section 22, an entry operation section 23, an exit operation section 24, a driving section 25, a vehicle detection section 26, a camera 27 and a communication section 28, and a control section 30 to which these function sections are connected.

The entry indication section 21 and the exit indication section 22 consist of a flat panel display such as a liquid crystal display or an organic EL display. The entry indication section 21 is disposed toward an entrance IN of the parking lot P, and the exit indication section 22 is disposed toward an exit OUT of the parking lot P. The entry indication section 21 and the exit indication section 22 indicate each kind of number such as a number of a parking space to enter, parking fee and date and time of parking, and operation items such as ten-key buttons and operation buttons based on indication control information provided from the control section 30.

The entry operation section 23 comprises a touch panel arranged on the indication surface of the entry indication section 21. In a similar manner, the exit operation section 24 also comprises a touch panel arranged on the indication surface of the exit indication section 22. Touch operation is entered by the users to the touch panels on the entry operation section 23 and the exit operation section 24 at a position corresponding to the above operation item displayed on the entry indication section 21 or the exit indication section 22, and operation information corresponding to the touch operation is provided to a control section 30. The entry operation section 23 and the exit operation section 24 may comprise a push-button switch instead of the touch panel. The entry operation section 23 may further comprise an outlet of a parking card, and the exit operation section 24 may further comprise a parking card slot and a charge slot.

The driving section 25 connects the flap F1 to F10 and the indication lamps L1 to L10, and comprises circuits for driving and lighting a motor and lamp mounted thereon. The driving section 25 drives and lights the motor and the lamp based on the driving control information provided from the control section 30.

The vehicle detection section 26 is connected to the loop coils C1 to C10, and comprises a circuit for detecting change in inductance of the loop coils C1 to C10 at entering/exiting of the vehicle M to/from each parking space. The vehicle detection section 26 outputs entry/exit state information to the control section 30, which shows a state of entering/exiting of the vehicle M and is generated based on the detected change in inductance of the loop coils C1 to C10. The control section 30 determines if the vehicle M enters into the parking spaces S1 to S10 based on the entry/exit state information.

The camera 27 takes a photo of a number plate of the vehicle M stops in front of a stop line W at the entrance IN. The camera 27 outputs photographing information to the control section 30, which obtains vehicle registration number of the vehicle M from the photographing information.

The communication section 28 connects the control section 30 to the network N, and communication between the control section 30 and the reservation managing server unit 40 can become available.

The control section 30 is a function section for operating the entire control unit 20, and comprises CPU, ROM, RAM and a microcomputer having each kind of interface. The control section 30 executes an opening and closing processing of the flap F1 to F10, lighting processing of the indication lamps L1 to L10, processing of confirming the entry state of the vehicle M, an indication control processing of the entry indication section 21 and the exit indication section 22, and entry/exit processing corresponding to an operation provided to the entry operation section 23 and the exit operation section 24.

A plurality of the parking spaces S1 to S10 of the parking lot P are assigned to either of a parking space for reservation or a spare parking space as shown in FIG. 4 by the reservation managing server unit 40 described later. The parking space for reservation is provided with the reservation from user with reservation and also is available for the user without reservation. The spare parking space is for the user with reservation instead of the parking space for reservation when the parking space for reservation to which the reservation of the user with reservation is set is used by the user without reservation. The number of the parking spaces for reservation and the spare parking spaces is variable, an initial value is set as 7 for the parking spaces for reservation and 3 for the spare parking spaces. The vehicle M can not enter to the spare parking space because the flap is opened as an initial state.

The control section 30 executes user guiding processing S100 as shown in FIG. 5 upon arrival of the user at the parking lot P. In this user guiding processing S100, the control section 30 guides the user with reservation to the parking space for reservation upon arrival of the user with reservation if the parking space to which the reservation is already set is vacant. If it is not vacant, the control section 30 guides the user with reservation to the spare parking space. The control section 30 guides the user without reservation to the vacant parking space for reservation upon arrival.

Specifically, in the user guiding processing S100, the control section 30 determines if the user with reservation arrives (S110). The control section 30 takes a photograph of a number plate of the vehicle M by the camera 27 when the vehicle M stops at the entrance IN, and obtains the vehicle registration number thereof and asks the reservation managing server unit 40 described later if the reservation in relation to the obtained vehicle registration number is set.

After that, when the control section 30 receives a response from the reservation managing server unit 40 that the reservation in relation to the vehicle registration number is set, the control section 30 decides that the user with reservation is arrived (proceeding to Y at S110), and if the parking space for reservation to which the reservation is already set is vacant (proceeding to Y at S120), lights the indication lamp of the parking spaces for reservation and guides the user with reservation thereto (S130).

If the parking space for reservation to which the reservation from the user with reservation is set is occupied (proceeding to N at S120), the control section 30 closes the flap at the spare parking space, lights the indication lamp and guides the user with reservation to the spare parking space (S140).

When the control section 30 receives a response from the reservation managing server unit 40 that the reservation in relation to the vehicle registration number is not set, the control section 30 decides that the user without reservation is arrived (proceeding to N at S110), and lights the indication lamp of the vacant parking space for reservation and guides the user without reservation thereto (S150). If there are no vacant parking spaces for reservation, the control section 30 conveys to the user without reservation that there are no parking spaces and encourages passing through the parking lot P and moving to other places.

The control section 30 may encourage use without reservation to input a scheduled usage period by indicating an operation button which an input is easy such as "1 hour" and "2 hours" on the entry indication section 21. The control section 30 transmits the input scheduled usage period to the reservation managing server unit 40 described later, which treats the user without reservation as the user with reservation to whom the reservation of the scheduled usage period is set, and thereby, the exit time can be predicted.

When the user with reservation arrives at the parking lot P, and if neither of the parking space for reservation and the spare parking space is vacant, the user with reservation may not be able to use the parking lot P. If, however, an appropriate adjustment is made on the number of the spare parking spaces (hereinafter, simply referred to as "spare number R" described later and a minimum value of an interval (hereinafter, simply referred to as "interval minimum value Q" between a reservation period in relation to the reservation already set to the parking spaces for reservation and a reservation period in relation to the reservation to be newly set to the parking space for reservation, it can reduce possibility that the user with reservation can not use the parking lot P to the degree that no problems are caused in an actual usage. If the user with reservation can not use the parking lot P, for example, a vacancy inquiry is made to other parking lot nearby located and the control section 30 guides the user with reservation to the other vacant parking lots.

The reservation managing server unit 40 (hereinafter, simply referred to as "server unit 40") comprises a computer for carrying out the reservation management of the parking lot P. The server unit 40 comprises a control section for controlling and a not shown storage section such as a hard disk. This storage section stores member registration information of the parking lot P and reservation setting information shown in FIG. 4. The member registration information includes, for example, characteristic information of the user with reservation such as name, age, gender, driving experience, occupation and color of a driving license (such as gold, blue), and the vehicle registration number. The reservation setting request transmitted from the user terminals U1 to U3 to the server unit 40 may include purpose of use such as business use, private use, lunch/dinner, meeting and so on, and may be treated as information in relation to characteristic of the user with reservation.

The server unit 40 (specifically, the control section) sets the spare number R and the interval minimum value Q as a parking resource of the parking lot P, and sets the reservation setting of the parking spaces corresponding to the reservation setting request from the user terminals U1 to U3.

The server unit 40 executes a parking resource adjusting processing S200 as shown in FIG. 6.

The server unit 40 sets the spare number R and the interval minimum value Q by using a usage behavior relation information J obtained from the information server unit 70.

Herein, the usage behavior relation information J is information showing an item affecting usage behavior of the parking lot P of either the user with reservation or the user without reservation. For example, items such as the weather in a location of parking lot P, the day and time and the event nearby the parking lot P may affect the usage behavior of the user in the parking lot P. The weather information, the day and time information and the event information are included in the usage behavior relation information J.

The weather in a location of parking lot P and a behavior of the users at the parking lot P have relationship. For example, if it is rainy, use of the parking lot P tends to relatively increase and time of use also tends to become longer than that of fine weather.

The day and time and the behavior of the use at the parking lot P have relationship. For example, use of the parking lot P relatively increases on days on weekend, days at the end of the month, and days of the month ending in 5 or 0. Furthermore, on specific day and time, such as 19:00 to 23:00 on Thursday, 18:00 to 24:00 on Friday, 11:00 to 15:00 on Saturday, the use of the parking lot P tends to relatively increase and time of use also tends to become longer than that of other day and time.

The event nearby the parking lot P and the behavior of the use at the parking lot P have relationship. For example, if there is a concert hall nearby the parking lot P, and when the event such as a concert is held at this concert hall, use of the parking lot P tends to relatively increase and the time of use also tends to become longer than usual. Definition of "nearby" of the parking lot P may be appropriately determined for every parking lot, such as within walking distance of 10 minutes and within an area of 500 m radius from the parking lot P. The definition of "nearby" may be determined corresponding to a scale of the event, namely, if the event is small scale (the number of people is 1000 or less), the nearby may be defined as an area of 500 radius from the parking lot P. If the event is large scale (the number of people is 1000 or more), the nearby may be defined as an area of 1000 radius from the parking lot P. The event may include an opening day and hour of a popular restaurant located nearby the parking lot P, or may include a construction work and a road work.

The relationship between each item of the weather, the day and time and the event and the usage behavior at the parking lot P can be statistically derived from each item at the parking lot P and actual usage behavior at that time. The relationship at the other parking lot having a similar condition of location may be useful for a newly established parking lot.

In the storage section of the server unit 40, there are stored the usage behavior relation information J (the weather, the day and time and the event) and relationship information K showing relationship between a spare number setting value Rs to be set to the spare number R and an interval minimum value setting value Qs to be set to the interval minimum value Q. The relationship information K is illustrated in Tables 1 and 2.

In Table 1, the relationship information K is classified as rainy weather (including snowing) and fine weather (other than rainy weather) in the weather information, as a specified day (weekend, holiday and the days of the month ending in 5 or 0) and an ordinary day (other than the specified day) in the day and time information, as existence and nonexistence of the event in the event information. The spare number setting value Rs and the interval minimum value setting value Qs are set corresponding to combination pattern of weather information, day and time information and event information. In Table 1, priority is made in order from the weather information, the day and time information and the event information, however, as relationship information K show in Table 2 described later, the spare number setting value Rs and the interval minimum value setting value Qs are set corresponding to each of round robin combination pattern of each information.

TABLE 1

Relationship Information K

| | Weather Information | Day and Time Information | Event Information | Spare Number Setting Value | Interval Minimum Value Setting Value |
|---|---|---|---|---|---|
| Pattern 1 | Fine Weather | Ordinary Day | None | 2 | 1 hour |
| Pattern 2 | Rainy Weather | Ordinary Day | None | 3 | 2 hours |
| Pattern 3 | (Optional) | Specified Day | None | 4 | 2 hours |
| Pattern 4 | (Optional) | (Optional) | Yes | 5 | 3 hours |

Specified Day: Saturday, Sunday, Holiday and Days of the Month Ending in 5 or 0
Ordinary Day: Other than Specified Day
Event Information
Yes: Existence of Event
None: Nonexistence of Event The spare number setting value Rs and the interval minimum value setting value Qs in the relationship information K shown in Table 1 are, as mentioned above, derived from each item at the parking lot P and actual usage behavior at that time based on the statistical analysis result.

The relationship information K shown in Table 2 is classified as rainy weather (including snowing) and fine weather (other than rainy weather) in the weather information, as a specified day 1 (Thursday 19:00 to 23:00), a specified day 2 (Friday 18:00 to 23:00), a specified day 3 (Saturday 11:00 to 15:00) and an ordinary day (other than these specified days 1 to 3) in the day and time information, as existence and nonexistence of the event in the event information. The spare number setting value Rs and the interval minimum value setting value Qs are set corresponding to combination pattern of weather information, day and time information and event information.

TABLE 2

Relationship Information K

| | Weather Information | Day and Time Information | Event Information | Spare Number Setting Value | Interval Minimum Value Setting Value |
|---|---|---|---|---|---|
| Pattern 1 | Fine Weather | Ordinary Day | None | 2 | 1 hour |
| Pattern 2 | Rainy Weather | Ordinary Day | None | 2 | 2 hours |

TABLE 2-continued

Relationship Information K

|  | Weather Information | Day and Time Information | Event Information | Spare Number Setting Value | Interval Minimum Value Setting Value |
|---|---|---|---|---|---|
| Pattern 3 | Fine Weather | Specified Day 1 | None | 3 | 2 hours |
| Pattern 4 | Rainy Weather | Specified Day 1 | None | 4 | 3 hours |
| Pattern 5 | Fine Weather | Specified Day 2 | None | 4 | 3 hours |
| Pattern 6 | Rainy Weather | Specified Day 2 | None | 5 | 2 hours |
| Pattern 7 | Fine Weather | Specified Day 3 | None | 3 | 2 hours |
| Pattern 8 | Rainy Weather | Specified Day 3 | None | 4 | 3 hours |
| Pattern 9 | Fine Weather | Ordinary Day | Yes | 4 | 2 hours |
| Pattern 10 | Rainy Weather | Ordinary Day | Yes | 5 | 2 hours |
| Pattern 11 | Fine Weather | Specified Day 1 | Yes | 4 | 3 hours |
| Pattern 12 | Rainy Weather | Specified Day 1 | Yes | 5 | 3 hours |
| Pattern 13 | Fine Weather | Specified Day 2 | Yes | 5 | 3 hours |
| Pattern 14 | Rainy Weather | Specified Day 2 | Yes | 5 | 3 hours |
| Pattern 15 | Fine Weather | Specified Day 3 | Yes | 3 | 2 hours |
| Pattern 16 | Rainy Weather | Specified Day 3 | Yes | 4 | 3 hours |

Specified Day 1: Thursday 19:00 to 23:00
Specified Day 2: Friday 18:00 to 23:00
Specified Day 3: Saturday 11:00 to 15:00
Ordinary Day: Other than Specified Days 1 to 3
Event Information
Yes: Existence of Event
None: Nonexistence of Event The spare number setting value Rs and the interval minimum value setting value Qs in the relationship information K shown in Table 2 are, as mentioned above, derived based on the statistical analysis result obtained from each item at the parking lot P and actual usage behavior at that time. The statistical analysis results are shown below.

Regarding the weather, (1) an excess rate of the reservation period of the user with reservation in the rainy weather becomes 1.35 times that in the fine weather.

Regarding the day and time, (1) the number of use of the user without reservation at 19:00 to 23:00 on Thursday becomes 3 times that of 11:00 to 15:00 on Thursday.

(2) the number of use of the user without reservation at 18:00 to 23:00 on Friday becomes 2.5 times that of 10:00 to 15:00 on Friday.

(3) the number of use of the user without reservation at 11:00 to 15:00 on Saturday becomes 2 times average of the number of use of 11:00 to 15:00 on Monday to Friday, including Saturday.

Regarding the event, if a large scale concert is held nearby the parking lot P, (1) the number of use of the user without reservation on the event day becomes 5 times average of the number of use on Monday to Friday in the month without any events.

(2) an excess rate of the reservation period of the user with reservation on the event day becomes 2 times that on Monday to Friday without any events.

In the server unit 40, the spare number setting value Rs and the interval minimum value setting value Qs are automatically updated by using the statistical analysis results in real time.

The server unit 40 stores the usage behavior relation information J obtained from the information server unit 70 and actual usage behavior information L showing the actual usage behavior at that time by corresponding each other in the storage section of the server unit 40. The actual usage behavior includes, for example, the number of use of the user with reservation and the user without reservation per unit time, the number of reservation already set, the number of excess usage of the reservation period of the user with reservation, and the usage period of the user without reservation. The server unit 40 performs analysis processing, for example, pseudo-polynomial time algorithm using dynamic programming, and FPRAS (polynomial-time approximation scheme) by using the usage behavior relation information J and the actual usage behavior information L, and also performs bayesian estimation and data mining such as frequent pattern extraction and regression analysis, and updates the relationship information K stored in the storage section based on the analysis results. The relationship information K may be updated manually.

In a configuration using the relationship information K in the above Table 2, if the excess rate of the reservation period of the user with reservation in the rainy weather is expected as 1.35 times and the spare number setting value Rs and the interval minimum value setting value Qs are determined in a previous analysis result, and new analysis results differs from 1.35 times, the spare number setting value Rs and the interval minimum value setting value Qs are updated based on the new analysis results. According to this step, accuracy of the spare number setting value Rs and the interval minimum value setting value Qs can be improved. The same can be applied to the items of the day and time, and event.

The server unit 40 dynamically sets the spare number setting value Rs and the interval minimum value setting value Qs specified by allocating the usage behavior relation information J (the weather information, the day and time information and the event information) to the relationship information K as the spare number R and the interval minimum value Q.

The server unit 40 allocates a part of a plurality of parking spaces S1 to S10 of the parking lot P based on the spare number R already set to the parking spaces for reservation, allocates other parts to the spare parking spaces, and transmits information in relation to these allocations to the control unit 20. The control unit 20 opens or closes the flap F1 to F10 based on the information, and secures the spare parking spaces corresponding to the spare number R. According to the present embodiment, as an example, the server unit 40 transmits the information in relation to the above allocation to the control unit 20 on a regular basis (for example, per one hour). The control unit 20 secures the spare parking spaces upon receipt of the information, and if the spare parking spaces are occupied at that time, the control unit 20 waits until parking spaces become vacant. If the server unit 40 updates the spare number setting value Rs in relation to the current time, the information in relation to the above allocation is transmitted to the control unit 20 at the updating time.

The server unit 40 makes a new reservation setting so that an interval between reservation period in relation to the reservation already set for the parking spaces for reservation and reservation period in relation to reservation newly set for the parking spaces for reservation does not become smaller than the interval minimum value Q. According to the present embodiment, an initial value of the interval minimum value Q is set as one hour. Furthermore, according to the present embodiment, the control section of the server unit 40 works as each function section such as a spare number setting section, an interval minimum value setting section, a reservation setting section, a margin period setting section, and a relationship information updating section. The storage section of the server unit 40 works as each storage section of the relationship information storage section and behavior information storage section.

Specific description will be made of a parking resource adjusting processing S200 with reference to FIG. 6.

The server unit 40 executes the parking resource adjusting processing S200 on the regular basis (for example, per one hour)

In the parking resource adjusting processing S200, the server unit 40 requests usage behavior relation information J against information server unit 70. The usage behavior relation information J is transmitted from the information server unit 70 corresponding to the request of the server unit 40, and the server unit 40 obtains the weather information, the day and time information and the event information included in the usage behavior relation information J (S220 to S240).

The server unit 40 sets the spare number R and the interval minimum value Q by using the weather information, the day and time information and the event information (S250, S260). Specifically, the server unit 40 allocates the weather information, the day and time information and the event information to the relationship information K stored in the storage section, and set specified spare number setting value Rs and the interval minimum value setting value Qs as the spare number R and the interval minimum value Q.

The server unit 40 executes a reservation setting processing S300 shown in FIG. 7.

In the reservation setting processing S300, if the server unit 40 receives reservation setting request from either or the user terminal U1 to U3 (S310), the server unit 40 determines if the parking spaces for reservation is available during the reservation request period shown by the reservation setting request. (S320). Specifically, the server unit 40 confirms the reservation setting information stored in the storage section and determines as "not available" for a period of the reservation period in relation to the reservation already set for each parking space for reservation plus the above interval minimum value Q added before and after the reservation period (namely, a period with a margin before and after the reservation period), and determines as "available" for the period other than the above non-available period. The server unit 40 confirms if the above reservation request period can be allocated to this available period.

If there are available parking spaces for reservation (proceeding to Y at S320), the server unit 40 sets a new reservation period to this parking spaces for reservation corresponding to the above reservation request period (S330) and notices reservation confirmation to the user terminals which made the reservation setting request (S340). Furthermore, if there are no available parking spaces for reservation, the server unit 40 does not set a new reservation period and notices reservation impossible to the user terminals which made the reservation setting request (S350). Namely, if an interval between reservation period in relation to the reservation newly set and reservation period in relation to reservation already set for the parking spaces for reservation becomes larger than the interval minimum value Q, reservation is set for the parking spaces for reservation.

As mentioned above, according to the parking reservation system 1 of the present embodiment, the number of the spare parking spaces (spare number R) is set by using the usage behavior relation information J in connection with the usage behavior of the user without reservation and the user with reservation at the parking lot P. Accordingly, items such as the weather, the day and time, and event nearby affecting the usage behavior of the user at the parking lot P are reflected to the number R of the spare parking spaces, and the spare parking spaces may be appropriately secured. Therefore, if the spare parking spaces are used instead of the parking spaces for reservation by the user with reservation, shortage of the spare parking spaces can be inhibited and reduction in the usage effect is also inhibited.

The interval minimum value (the interval minimum value Q) is set by using the usage behavior relation information J for an interval between reservation period in relation to the reservation already set for the parking spaces for reservation and reservation period in relation to reservation newly set for the parking spaces for reservation. If the interval between reservation period in relation to the reservation newly set and reservation period in relation to reservation already set for the parking spaces for reservation become larger than the interval minimum value Q, the reservation is set for the parking spaces for reservation. For example, items such as the weather, the day and time, and event nearby affecting the usage behavior of the user at the parking lot P are reflected to the interval minimum value Q, and the interval is appropriately secured between reservation period in relation to the reservation set for the parking spaces for reservation and other reservation period in relation to other reservations, therefore the reservation can be set appropriately. If the interval minimum value Q becomes larger, possibility that the user with reservation of the previous reservation uses over period and delayed into next reservation becomes small. Therefore, it can be avoided that the user with reservation can not use the parking spaces for reservation, the usage effect of the parking spaces for reservation can be inhibited by making the minimum value small, and these balance can be adjusted.

The relationship information K is stored which shows the relationship between the usage behavior relation information J and the spare number setting value Rs to be set as the spare number R, and the spare number setting value Rs specified from the relationship information K by using usage behavior relation information J is set as the spare number R. Thus, the spare number R can be set in a simple manner.

Furthermore, the relationship information K is stored which shows the relationship between the usage behavior relation information J and the interval minimum value setting value Qs to be set as the interval minimum value Q, and the interval minimum value setting value Qs specified from the relationship information K by using usage behavior relation information J is set as the interval minimum value Q. Thus, the interval minimum value Q of the reservation period can be set in a simple manner.

There are correspondingly stored the usage behavior relation information J and the actual usage behavior information L, and the relationship information K is updated by using the usage behavior relation information J and the actual usage behavior information L. Thus, the new usage behavior relation information J and the actual usage behavior information L are stored and such information can be reflected on the stored relationship information K. Accordingly, accuracy may be improved by reflecting and learning the usage behavior at the parking lot of either the user with reservation or the user without reservation to the relationship information K.

It becomes possible to effectively inhibit the case in which the user with reservation can not use the parking space, and effectively inhibit reduction in usage effect.

According to the above embodiment, the spare number R and the interval minimum value Q are set by using the usage behavior relation information J, however, configuration may be made by setting only either one.

The usage behavior relation information J may include items not only the weather information, the day and time information, the event information, but other items affecting the usage behavior of the user at the parking lot P. The usage behavior relation information J may relate to the usage behavior at the parking lot P of at least either of the user with reservation or the user without reservation.

The usage behavior relation information J may include information in relation to the previous usage behavior of the user with reservation at the parking lot P (characteristic information of the user with reservation). Specifically, the server unit 40 stores the previous usage behavior such as the actual usage period and the number of cancel to the reservation period for every user with reservation, and the number of excess and excess time of the reservation period for every user with reservation which are calculated by the previous usage behavior can be included as the usage behavior relation information J. If the number of excess of the reservation period satisfies a predetermined individual setting condition (for example, three or more times) the server unit 40 may set the interval minimum value Q individually corresponding to the reservation period excess time for the reservation period already set. For example, if a certain user with reservation has three or more times of the reservation period excess number and 1.8 hour of an average value of the reservation period excess time, the interval minimum value Q for the reservation period in relation to the user with reservation may be set as 2 hours individually. Further individual setting condition regarding characteristics of the user with reservation, such as age, gender and driving experience may be set.

For example, if usage start number and usage start time before the reservation period for every user with reservation are calculated from the previous usage behavior and included in the usage behavior relation information J, and the usage start number before the reservation period satisfies a predetermined individual setting condition (for example, usage start number is three or more times), the server unit 40 may set the interval minimum value Q individually corresponding to the usage start time before the reservation period for the reservation period already set. For example, if a certain user with reservation has three or more times of the usage start number before the reservation period and 0.3 hours of a maximum value of the usage start time before the reservation period, the interval minimum value Q for the reservation period regarding the reservation of the user with reservation may be set as 0.5 hours individually.

Additionally, the interval minimum value Q before the reservation period and the interval minimum value Q after the reservation period are set individually (namely, set to different values).

The usage behavior relation information J may include information in relation to the characteristics of the user with reservation, such as age, gender, driving experience which is extruded from the member registration stored in the server unit 40 (the characteristic information of the user with reservation), and the server unit 40 may set the spare number R and the interval minimum value setting value Qs as mentioned above by using information in relation to the characteristics of the user with reservation. In this case, for example, the relationship information K showing relationship between information in relation to the characteristics of the user with reservation and the spare number setting value Rs and the interval minimum value setting value Qs may be made as well as Tables 1 and 2, and the spare number R and the interval minimum value Q may be set by allocating the information in relation to the characteristics of the user with the reservation to the relationship information K.

Usage unit price at the reservation use by the user with reservation may be set based on the previous usage behavior at the parking lot P such as the reservation period excess number or the reservation period compliance number. For example, if the user with reservation complies with all of the reservation period at the previous reservation usage, predetermined discount from the standard unit price may be made, and if the reservation period excess number is satisfies the individual setting condition (for example, three or more times), surcharge which a predetermined charge may be added to the standard unit price may be adapted to such user with reservation. Such penalty clearly makes the user conscious about the excess of the reservation period, and thereby incidence of the reservation period excess is reduced and it becomes easier to obtain the much reservation. The fee for the user who often exceeds the reservation period becomes expensive, and the use by such user may be reduced and thereby the reservation period excess rete may be reduced.

Tables 3 and 4 show an example of information in relation to the previous usage behavior of the individual user with reservation at the parking lot P stored in the storage section of the server unit 40 and the characteristic information including information in relation to characteristics of the individual user with reservation. The characteristic information may include information in relation to previous usage behavior at the parking lot other than the parking lot P (such as reservation usage number and reservation period excess number).

TABLE 3

| | |
|---|---|
| Name | Taro Suzuki |
| Age | 28 |
| Attribution | Adult |
| Driving Experience | 10 years |
| Purpose for Reservation of | Dining (Private) |
| Nearest Parking Lot | |
| Number of Usage | 5 |
| Number of Excess | 2 |
| Excess in Total | 32 minutes |
| Rate of Excess | 40% |
| Average of Excess | 16 minutes |

TABLE 3-continued

| Current Reservation Unit Price | 1,000 JPY/hour |
|---|---|
| Next Reservation Unit Price | 1,050 JPY/hour |

TABLE 4

| Name | Jiro Tokkyo |
|---|---|
| Age | 45 |
| Attribution | Adult |
| Driving Experience | 23 years |
| Purpose for Reservation of Nearest Parking Lot | Meeting (Business) |
| Number of Usage | 23 |
| Number of Excess | 1 |
| Excess in Total | 15 minutes |
| Rate of Excess | 4.35% |
| Average of Excess | 15 minutes |
| Current Reservation Unit Price | 800 JPY/hour |
| Next Reservation Unit Price | 780 JPY/hour |

The usage behavior relation information J may include information in relation to the previous usage behavior of the user without reservation at the parking lot P. Specifically, for example, the relationship information K may be made by expecting the number of visitors of the user without reservation based on the result statistically analyzing relationship, for example, between the day and time and visiting possibility from the previous usage behavior, and the spare number R and the interval minimum value Q are set by using this relationship information K.

According to the above embodiment, the reservation managing server unit 40 obtains the usage behavior relation information J from the information server unit 70, however, for example, the reservation managing server unit 40 may store the usage behavior relation information J at the storage section. The usage behavior relation information J may be collected automatically or set manually.

According to the above embodiment, a plurality of the parking spaces S1 to S10 are allocated to either the parking spaces for reservation or the spare parking spaces, however, it is not limited thereto. For example, a part of the plurality of the parking spaces may be allocated to the parking spaces for reservation, and other part may be allocated to the spare parking spaces, and remaining part may be allocated to the parking spaces for the user without reservation. Furthermore, the number of the parking spaces for reservation may be fixed and the number of the spare parking spaces may be adjusted as the parking spaces for the user without reservation.

According to the above embodiment, the spare number setting value Rs and the interval minimum value setting value Qs obtained by allocating the usage behavior relation information J to the relationship information K are set as the spare number R and the interval minimum value Q, however, it is not limited thereto. For example, the server unit 40 performs an analysis processing at a real time for every updating each information by using the usage behavior relation information J and the actual usage behavior information L correspondingly stored in the storage section, and directly derives the spare number setting value Rs and the interval minimum value setting value Qs from the analysis results, which may be set as the spare value R and the interval minimum value Q.

According to the above embodiment, the reservation managing server unit 40 determines the period of the reservation period in relation to the reservation already set for each parking space for reservation plus the interval minimum value Q added before and after the reservation period as "not available" in the reservation setting processing S300, and determines as "available" for the period other than the above period and set the reservation by allocating the reservation request period in relation to the reservation setting request to the available period. In other word, if the interval between the reservation period in relation to the newly set reservation and the reservation period in relation to the reservation already set for the parking spaces for reservation becomes greater than the interval minimum value Q, the reservation server unit 40 may set the reservation to the parking spaces for reservation. However reservation setting method is not limited thereto.

For example, if the interval between the reservation period in relation to the newly set reservation and the reservation period in relation to the reservation already set for the parking spaces for reservation becomes greater than the interval minimum value Q, And if margin period is added before and after the reservation period in relation to all of reservation already set to the all of parking spaces for reservation, an extended reservation period is not timely overlapped each other, the server unit 40 may set the before-mentioned reservation to the parking spaces for reservation. Such configuration is described with reference to FIGS. 8 to 11.

Figure 8:
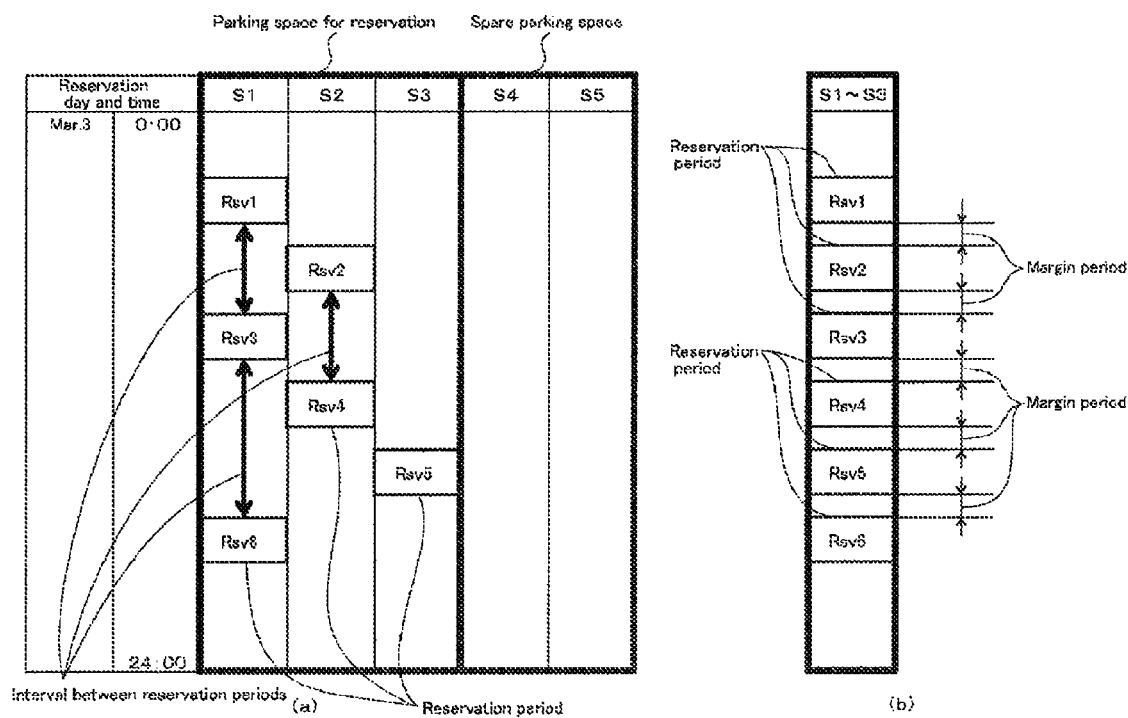
FIG. 8 is a diagram illustrating an example of reservation setting in the reservation managing server unit in a modified example.
Figure 9:
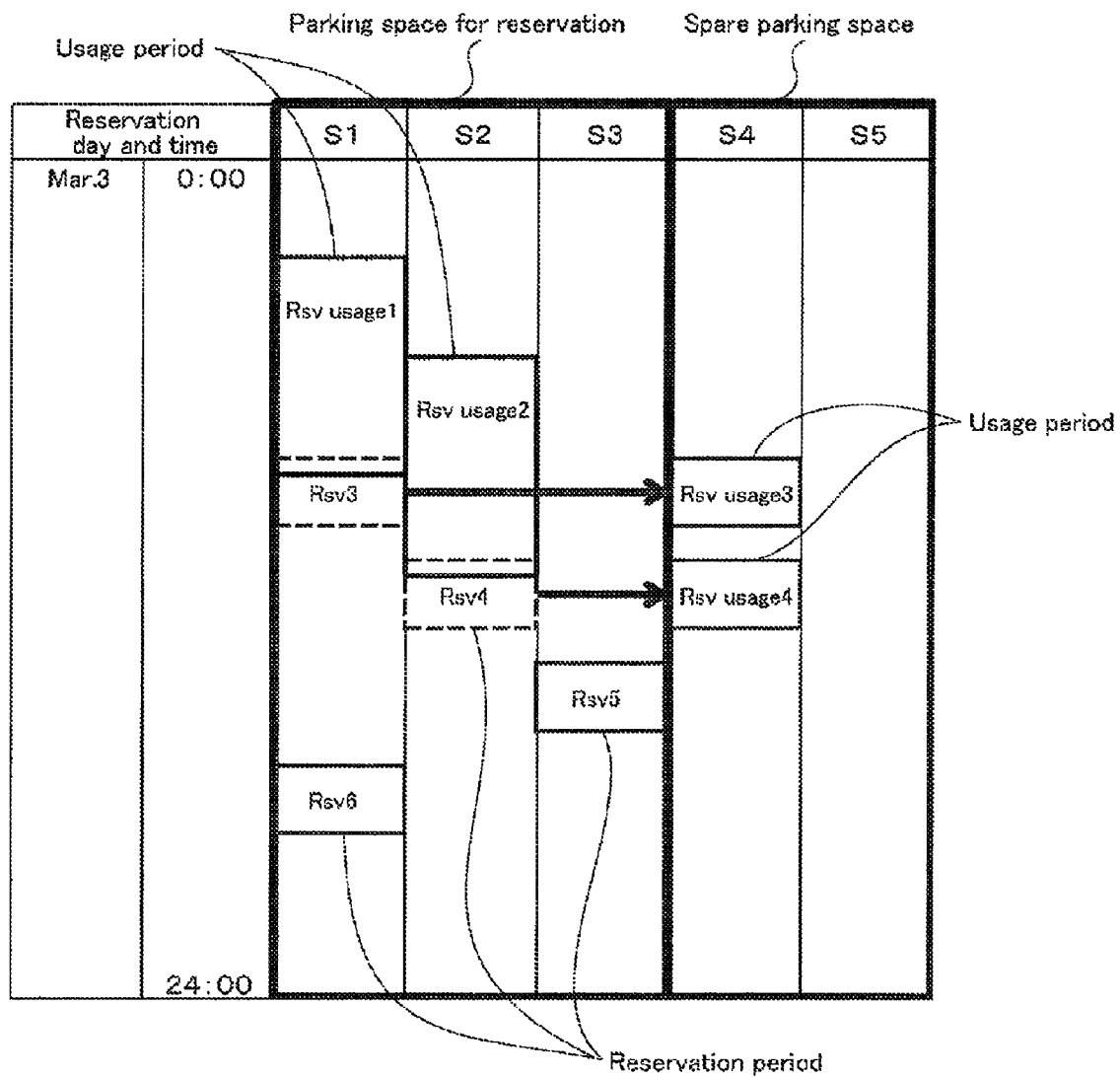
FIG. 9 is diagram illustrating that a period used by the user with reservation exceeds a reservation period in a state that the reservation setting of FIG. 8 has been made.
Figure 10:
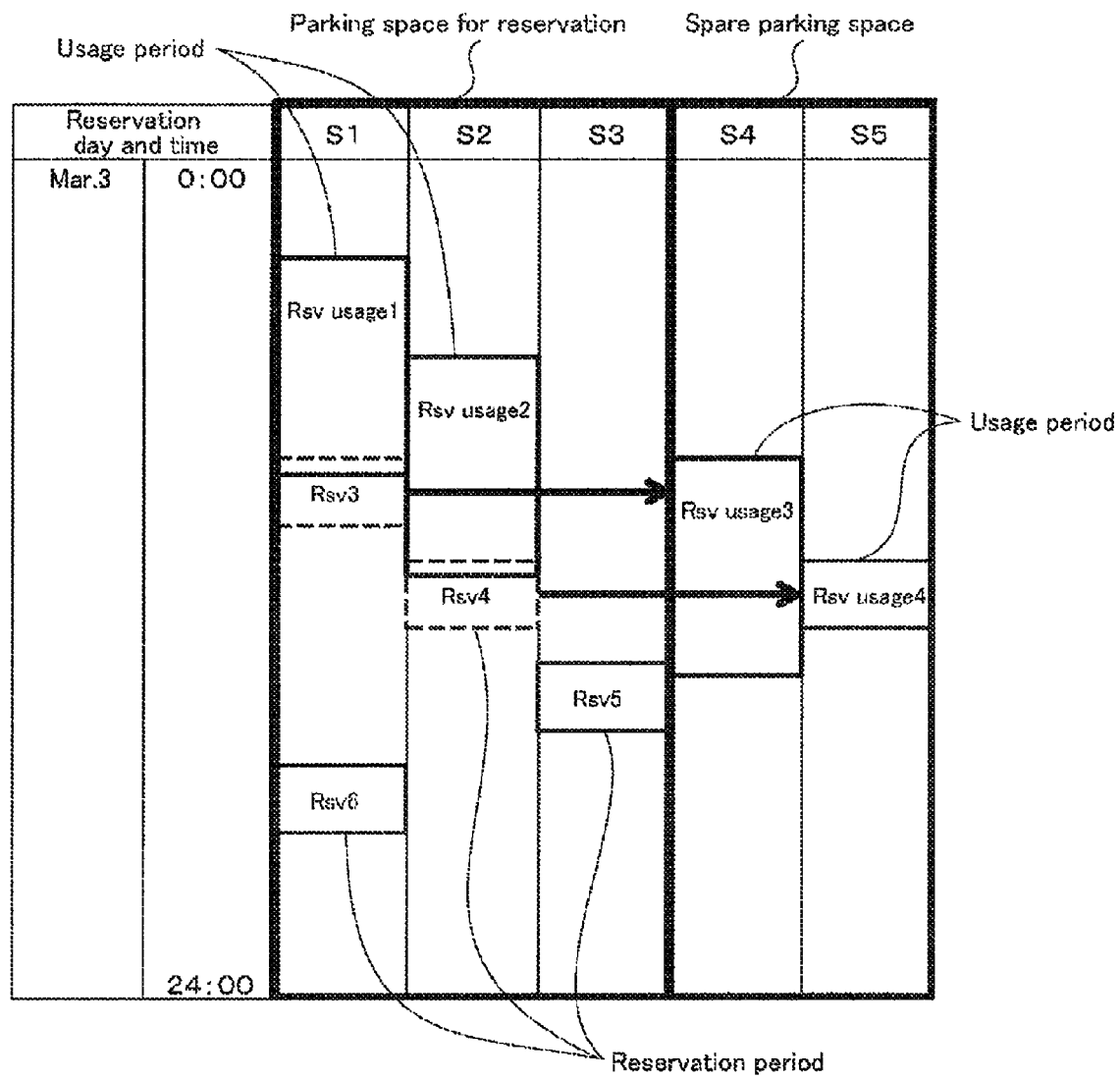
FIG. 10 is a diagram illustrating that a period used by the user with reservation who is guided to a spare parking space exceeds a reservation period in a state that the reservation setting of FIG. 8 has been made.
Figure 11:
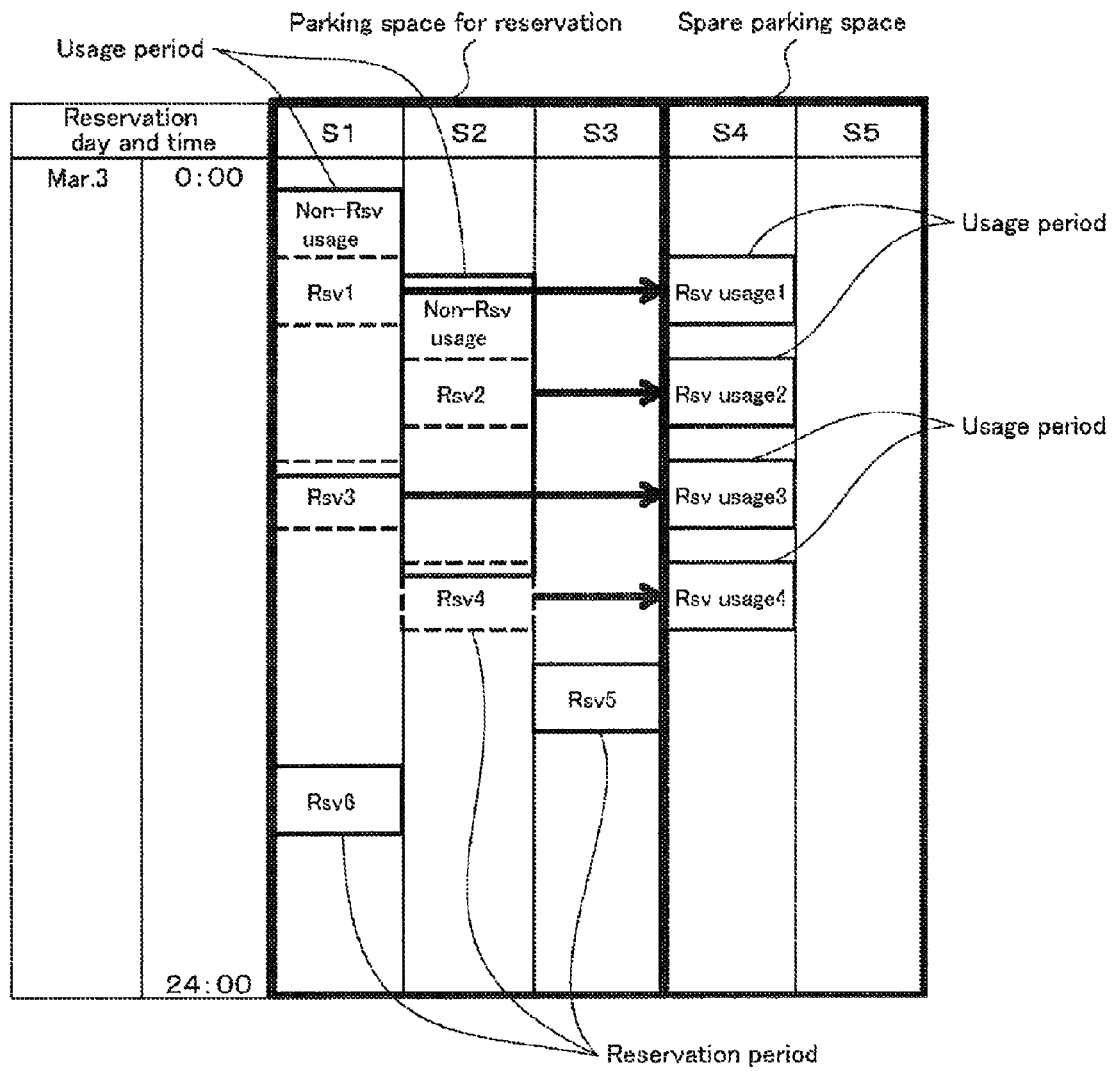
FIG. 11 is a diagram illustrating that a user without reservation uses the parking space in a state that the reservation setting of FIG. 8 has been made.

FIG. 8 shows a diagram illustrating an example of reservation setting in the reservation managing server unit of FIG. 1 in a modified example. FIG. 9 is diagram illustrating that a period used by the user with reservation exceeds a reservation period in a state that the reservation setting of FIG. 8 has been made. FIG. 10 is a diagram illustrating that a period used by the user with reservation who is guided to a spare parking space exceeds a reservation period in a state that the reservation setting of FIG. 8 has been made. FIG. 11 is a diagram illustrating that a user without reservation uses the parking space in a state that the reservation setting of FIG. 8 has been made.

As shown in FIG. 8(a) the configuration will be described that the reservation managing server unit 40 performs reservation management of the parking lot P having the parking spaces S1 to S5. In such configuration, for example, the spare number R is set as 2, three parking spaces S1 to S3 are allocated to the parking spaces for reservation, and two parking spaces S4 and S5 are allocated to the spare parking spaces.

Regarding the parking spaces S1 to S3 for each reservation, reservations 1 to 6 are set so that the interval between the reservation periods becomes greater than the minimum interval value Q. Furthermore, the reservations 1 to 6 are set with margin period therebetween so as not to be timely overlapped shown in FIG. 8(b). FIG. 8(b) shows the reservations 1 to 6 set to the parking spaces S1 to S3 for reservation This margin period may set a common standard value for overall parking reservation system as a fixed value (for example, either time during 0 to 2 hours, if 0 is selected, the margin period is not added). This standard value may be variable and set by using the usage behavior relation information.

Additionally, the margin period may be set individually by using the characteristic information of the user with reservation. For example, coefficient may be made corresponding to gender (male, female), age (under 20's, 30's to 40's, over 50's), occupation (a company employee, self-employment), object of usage (for business purpose, private purpose), and the margin period may be set by combining such coefficients to the standard value. The analysis processing (learning) is made to such coefficient by using the usage behavior relation information J and the actual usage behavior information L, and may be updated based on the analysis results. The margin period may be set by using information similar to the relationship information K according to the present embodiment.

In a case that the reservations 1 to 6 are set as shown in FIG. 8(a), if an actual usage period of the user with reservation in relation to the reservation 1 (reservation usage 1) is exceeded to the reservation period in relation to the reservation 3, the user with reservation in relation to the reservation 3 may be guided to the spare parking spaces S4 (the reservation usage 3). If the user with reservation in relation to the reservation 2 exceeds an actual usage period (reservation usage 2) to the reservation period in relation to the reservation 4, the user with reservation in relation to the reservation 4 is guided for the spare parking spaces S4 (reservation usage 4). At this time, the reservation periods in relation to the reservations 3 and 4 are not overlapped each other, the user with reservations in relation to the reservations 3 and 4 may be guided to one spare parking space S4.

As shown in FIG. 10, even if the actual usage period of the user with reservation in relation to the reservation 3 (reservation usage 3) at the spare parking spaces S4 is exceeded to the reservation period in relation to the reservation 4, the user with reservation in relation to the reservation 4 may be guided to the spare parking spaces S5 (reservation usage 4).

As shown in FIG. 11, if the reservation period in relation to the reservations 1 and 3 is not available since the parking spaces for reservation S1 is used by the user without reservation, the user with reservation in relation to the reservations 1 and 3 may be guided to the spare parking spaces S4 (reservation usages 1 and 3). Furthermore, if the user without reservation uses the parking spaces for reservation, and the reservation periods in relation to the reservation 2 and 4 are not available, the users with reservation in relation to reservations 2 and 4 may be also guided to the spare parking spaces S4 (reservation usages 2 and 4). At this time, the reservation periods in relation to the reservations 1 to 4 are not overlapped each other, the users with reservation in relation to the reservations 1 to 4 may be guided to one spare parking space S4.

Thus, for example, when the just before user with reservation uses the parking spaces for reservation to which the reservation already set by extending the usage period for intruding the usage period in relation to the reservation, or the vehicle without reservation is parked, even if the user with reservation is guided to the spare parking spaces in relation to the reservation, the reservation periods of the users with reservation are not overlapped. Therefore, the user with reservation may be stored in the spare parking spaces effectively. Furthermore, if the user with reservation guided to the spare parking space uses over the reservation period, the margin period absorbs an exceeded period and the user with reservation effectively stores the vehicle to the spare parking space. An individual setting may be made to the margin period added before and after the reservation period in relation to the reservation by using the characteristic information of the user with reservation showing an individual characteristic of the user with reservation in relation to the reservation which is set to the parking spaces for reservation. Thereby, for example, reduction in the usage effect of the parking space is effectively inhibited in comparison with a configuration for setting common margin period to overall parking reservation system. In view of an operation described later, by improving probability that the user with reservation does not exceeds the reservation period in usage, even if the number of the spare parking space is one or two, possibility that the user with reservation can not use the parking lot can be reduced to a level that problems substantially does not occur.

In FIGS. 8 to 11, descriptions are made with reference to configurations that the server unit 40 performs the reservation management of the parking lot P comprising file parking spaces S1 to S5, however, for example, a similar manner can be applied to the configuration of the reservation management of the parking lot P comprising the above-mentioned 10 parking spaces S1 to S10. Additionally, the parking spaces S1 to S10 are virtually divided into two parking lots, one for the parking spaces S1 to S5, and another for the parking spaces S6 to S10, and the parking spaces for reservation and the spare parking spaces are allocated to each virtual parking lot, and the reservations may be set in a similar manner as the above-mentioned configuration for every virtual parking lot. As for dividing manner, it is not necessary to divide into the same number of the parking spaces, such that 10 parking spaces S1 to S10 may be divided into the number of 4, 3, and 3. The number of the parking spaces of the parking lot is optional.

According to the above embodiment, for example, member registration is encouraged by discounting fees for the reservation usage for the user with reservation more than that for the user without reservation. On the other hand, if the user with reservation exceeds the reservation period, penalty fee may be charged (for example, three times of the usage fee). From the view of the operation, the reservation usage may be increased for improving predictability by analyzing the usage behavior for every user with reservation having the member registration and for suppressing usage exceeding the reservation period. The penalty fee may be avoided by requesting an extension of the reservation period from the user terminals U1 to U3 before pasting a half of the reservation period, and the predictability may be improved by grasping an exit schedule time in advance if the reservation period is exceeded. If the user with reservation continues a predetermined number of usages complying with the reservation period, discount rate in the usage fee is increased. On the other hand, if the user with reservation continues a predetermined number of usages exceeding the reservation period (for example, three or more times), discount rate in the usage fee is decreased or the member registration may be temporarily suspended (for example, three months), and the usage of exceeding reservation period may be inhibited. Nevertheless, if the user with reservation performs a predetermined number or more (for example, three times) of usage exceeding the reservation period, the member registration may be cancelled and the user may be disqualified from reservation usage by blacklisting. The usage exceeding the reservation period may be subject to surcharge of the parking fee. Thus, from the view point of the operation, the usage exceeding the reservation period can be effectively inhibited.

The embodiments of the present invention is described above, however, the present invention is not limited to these examples. Those skilled in the art may appropriately add and delete components, modify the design, combine characteristics of the embodiments within the scope of the present invention unless subject of the present invention is not changed.

DESCRIPTION OF REFERENCE NUMERALS 1 parking reservation system
10 parking management unit
20 control unit
21 entry indication section
22 exit indication section
23 entry operation section
24 exit operation section
25 driving section
26 vehicle detection section
27 camera
28 communication section
30 control section
40 reservation managing server unit (spare number setting section, interval minimum value setting section, reservation setting section, relationship information updating section, margin period setting section, relationship information storage section, behavior information storage section)
70 information server unit
J usage behavior relation information
K relationship information
L actual usage behavior information
N network
S100 user guiding processing
S200 parking resource adjusting processing
S300 reservation setting processing
U1 to U3 user terminal
P parking lot
S1 to S10 parking space
F1 to F10 flap
C1 to C10 loop coil
L1 to L10 indication lamp
M vehicle
Q interval minimum value
Qs interval minimum value setting value
R number of spare parking space (spare number)
Rs spare number setting value
IN entry
OUT exit

What is claimed is:

1. A parking reservation system for a parking lot provided with a plurality of parking spaces, the system comprising:
a control unit comprising:
a processor;
a memory; and
a camera; and
flaps disposed in each of the plurality of parking spaces, the flaps being controlled by the processor;
wherein the system is configured to perform steps comprising:
setting each of the plurality of parking spaces in the parking lot as being of either a first type of parking space or a second type of parking space;
wherein the first type of parking space: is reservable in advance for parking using the system; and, during a time period for which the first type of parking space is reserved, allows a different user, who does not have a parking reservation, to use the first type of parking space for parking instead of the user for whom the first type of parking space was reserved; and
wherein the second type of parking space: provides parking spaces to users who had parking reservations but whose parking spaces were taken during the time period of their parking reservations by users without parking reservations; and does not allow use of its parking spaces to users who did not have parking reservations;
wherein the system does not allow any type of parking for users who did not have parking reservations when there are no unoccupied parking spaces of the first type:
wherein there is always at least one parking space of the first type, and there is always at least one parking space of the second type; and
wherein the number of parking spaces set as the first type and the number of parking spaces set as the second type are based on usage behavior relation information, in relation to usage behavior with respect to the parking lot by at least one of a user with a parking reservation and a user without a parking reservation; and
controlling entry of a vehicle into one of the plurality of parking spaces, in accordance with the parking space being of either the first type or the second type, by opening the flap disposed in the one of the plurality of parking spaces.

2. The parking reservation system according to claim 1, wherein the system is configured to perform further steps comprising:
storing relationship information showing a relation between said usage behavior relation information and a spare number setting value to be set as number of parking spaces of the second type, wherein
said spare number setting value is specified from said relationship information based on said usage behavior relation information, and is set as the number of parking spaces of the second type.

3. The parking reservation system according to claim 2, wherein the system is configured to perform further steps comprising:
correlating and storing said usage behavior relation information and an actual usage behavior information showing actual said usage behavior; and
updating said relationship information based on said usage behavior relation information and said actual usage behavior information.

4. The parking reservation system according to claim 1, wherein
said usage behavior relation information includes information selected from the group consisting of weather, a time, and an event held nearby said parking lot.

5. The parking reservation system according to claim 1, wherein
said usage behavior relation information includes characteristic information of the user with a parking reservation, including at least either of information in relation to a previous usage behavior at the parking lot of said user with a parking reservation and information in relation to characteristics of said user with a parking reservation.

6. The parking reservation system according to claim 1, wherein
said usage behavior relation information includes information in relation to a previous usage behavior at said parking lot of said user without a parking reservation.

7. The parking reservation system according to claim 1, wherein the camera acquires an image of a license plate in the parking lot.

8. A parking reservation system for a parking lot provided with a plurality of parking spaces, the system comprising:

a control unit comprising:
  a processor;
  a memory; and
  a camera; and
flaps disposed in each of the plurality of parking spaces, the flaps being controlled by the processor;
wherein the system is configured to perform steps comprising:
  setting each of the plurality of parking spaces in the parking lot as being of either a first type of parking space or a second type of parking space:
    wherein the first type of parking space: is reservable in advance for parking using the system; and, during a time period for which the first type of parking space is reserved, allows a different user, who does not have a parking reservation, to use the first type of parking space for parking instead of the user for whom the first type of parking space was reserved; and
    wherein the second type of parking space: provides parking spaces to users who had parking reservations but whose parking spaces were taken during the time period of their parking reservations by users without parking reservations; and does not allow use of its parking spaces to users who did not have parking reservations;
  wherein the system does not allow any type of parking for users who did not have parking reservations when there are no unoccupied parking spaces of the first type;
  wherein there is always at least one parking space of the first type, and there is always at least one parking space of the second type; and
  wherein the number of parking spaces set as the first type and the number of parking spaces set as the second type are based on usage behavior relation information, in relation to usage behavior with respect to the parking lot by at least one of a user with a parking reservation and a user without a parking reservation; and
  controlling entry of a vehicle into one of the plurality of parking spaces, in accordance with the parking space being of either the first type or the second type, by opening the flap disposed in the one of the plurality of parking spaces;
  setting a minimum value for a time interval between consecutive reservation time periods for at least one parking space of the first type, based on the usage behavior relation information, in relation to usage behavior with respect to the parking lot by at least one of a user with a parking reservation and a user without a parking reservation;
  receiving a parking reservation request from a particular user;
  determining that a start time for the parking reservation request is at least the minimum value for the time interval past the end of the previous reservation time period for a particular parking space; and
  reserving the particular parking space for the parking reservation request from the particular user.

9. The parking reservation system according to claim 8, wherein the system is configured to perform further steps comprising:
  storing relationship information showing a relationship between said usage behavior relation information and an interval minimum value setting value to be set as the minimum value of the time interval, wherein said interval minimum value setting value is specified from said relationship information based on said usage behavior relation information, and is set as the minimum value of the time interval.

10. The parking reservation system according to claim 9, wherein the system is configured to perform further steps comprising:
  correlating and storing said usage behavior relation information and an actual usage behavior information showing actual said usage behavior; and
  updating said relationship information based on said usage behavior relation information and said actual usage behavior information.

11. The parking reservation system according to claim 8, wherein
  said usage behavior relation information includes characteristic information of the user with a parking reservation including at least either of information in relation to a previous usage behavior at the parking lot of said user with a parking reservation and information in relation to characteristics of said user with a parking reservation, and
  when said characteristic information of said user with a parking reservation satisfies an individual setting condition, the minimum value for the time interval is set individually based on the characteristic information of the user with a parking reservation.

12. The parking reservation system according to claim 11, wherein
  the minimum value for said time interval is set before and after the time period, of the parking reservation for the parking space of the first type of the user with a parking reservation, individually based on the characteristic information of the user with a parking reservation.

13. The parking reservation system according to claim 8, wherein the system is further configured to perform the step of:
  before reserving the particular parking space, determining that the time period, defined by the start time and an end time for the parking reservation request, does not overlap the time periods corresponding to any of the already-existing parking reservations for the parking spaces of the first type.

14. The parking reservation system according to claim 13, wherein the system is further configured to perform the step of:
  before reserving a parking space of the first type, determining that a time period, defined by a start time for a corresponding parking reservation request and an end time for the corresponding parking reservation request, does not overlap the time periods corresponding to any of the already-existing parking reservations for the parking spaces of the first type, wherein the time periods corresponding to the already-existing parking reservations have been enlarged by adding margin periods to their beginnings and endings.

15. The parking reservation system according to claim 14, wherein
  said usage behavior relation information includes characteristic information of the user with a parking reservation including at least either of information in relation to an individual previous usage behavior at the parking lot of said user with a parking reservation and information in relation to characteristics of said user with a parking reservation, and
  said margin periods are set based on said characteristic information of the user with a parking reservation.

16. The parking reservation system according to claim 8, wherein the camera acquires an image of a license plate in the parking lot.

\* \* \* \* \*